(12) United States Patent
Kobayashi et al.

(10) Patent No.: US 10,592,401 B2
(45) Date of Patent: Mar. 17, 2020

(54) HUMAN MACHINE BLUR TESTING METHOD

(71) Applicant: Panasonic Automotive Systems Company of America, Division of Panasonic Corporation of North America, Peachtree City, GA (US)

(72) Inventors: Sachiko Kobayashi, Novi, MI (US); Patrick Hanslits, Clarkston, MI (US); David Lyon, Huntington Woods, MI (US); Gary L. Braddock, Grosse Pointe, MI (US); Narayani Mital, Royal Oak, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 284 days.

(21) Appl. No.: 15/418,031

(22) Filed: Jan. 27, 2017

(65) Prior Publication Data

US 2017/0213323 A1    Jul. 27, 2017

Related U.S. Application Data

(60) Provisional application No. 62/287,603, filed on Jan. 27, 2016.

(51) Int. Cl.
  *G06F 11/36*  (2006.01)
  *G06F 8/38*   (2018.01)
  *G06T 11/60*  (2006.01)

(52) U.S. Cl.
  CPC ......... *G06F 11/3688* (2013.01); *G06F 8/38* (2013.01); *G06T 11/60* (2013.01); *G06T 2200/24* (2013.01)

(58) Field of Classification Search
  CPC ....................................................... G06F 8/38
  (Continued)

(56) References Cited

U.S. PATENT DOCUMENTS 5,748,943 A * 5/1998 Kaepp ................ G06F 17/5095
                                                    700/104
6,392,642 B1 * 5/2002 Wu ...................... G09G 3/2092
                                                    345/213

(Continued)

OTHER PUBLICATIONS

Tina Sieber, "Multiple Ways to Capture or Print What You See on Your Screen", published Apr. 17, 2014, https://www.makeuseof.com/tag/multiple-ways-capture-print-see-screen/, pdf pp. 1-7 (Year: 2014).*

*Primary Examiner* — Arpan P. Savla
*Assistant Examiner* — Henry Orr
(74) *Attorney, Agent, or Firm* — Laurence S. Roach, Esq.

(57) ABSTRACT

A method of validating a design for a graphical user interface of a motor vehicle includes creating a tentative design, and/or a few drafts or prototype for the graphical user interface. A blurred version of the tentative graphical user interface design is produced. The blurred version of the tentative graphical user interface design is tested for readability and whether the overall GUI design is suited to be perceived at a glance. If it is determined that the blurred version of the tentative graphical user interface design is not readable or understandable, then the graphical user interface is redesigned and the producing and testing steps are repeated for the redesigned graphical user interface. After the blurred graphical user interface design has been determined to be readable, then a higher fidelity graphical user interface is made.

18 Claims, 7 Drawing Sheets

(58) Field of Classification Search
USPC .......................................................... 715/763
See application file for complete search history.

(56) References Cited

U.S. PATENT DOCUMENTS

| | | | | |
|---|---|---|---|---|
| 6,763,515 B1* | 7/2004 | Vazquez | ................... | G06F 8/34 |
| | | | | 715/967 |
| 8,295,645 B2* | 10/2012 | Shimodaira | ............. | G06T 5/002 |
| | | | | 348/580 |
| 9,311,222 B1* | 4/2016 | Avery | ................... | G06F 3/0481 |
| 9,626,768 B2* | 4/2017 | Tumanov | ................... | G06T 7/11 |
| 2002/0135594 A1* | 9/2002 | Kondo | ................. | H04N 7/0125 |
| | | | | 345/589 |
| 2005/0285965 A1* | 12/2005 | Zimmer | ................ | G06F 3/0481 |
| | | | | 348/333.11 |
| 2007/0050419 A1* | 3/2007 | Weyl | ....................... | G06Q 30/00 |
| 2007/0052997 A1* | 3/2007 | Hull | ................... | G06K 9/00463 |
| | | | | 358/1.15 |
| 2007/0143695 A1* | 6/2007 | Strenzl | ..................... | G06F 8/38 |
| | | | | 715/762 |
| 2007/0165904 A1* | 7/2007 | Nudd | ................. | G06K 9/00442 |
| | | | | 382/100 |
| 2008/0111841 A1* | 5/2008 | LeMay | ............... | G07F 17/3211 |
| | | | | 345/699 |
| 2008/0118175 A1* | 5/2008 | Rai | ......................... | G06T 5/20 |
| | | | | 382/264 |
| 2010/0262929 A1* | 10/2010 | Avery | ................... | G06F 3/0488 |
| | | | | 715/771 |
| 2011/0098837 A1* | 4/2011 | Yucel | ................... | G06F 17/5086 |
| | | | | 700/104 |
| 2011/0123068 A1* | 5/2011 | Miksa | ..................... | G06T 5/002 |
| | | | | 382/105 |
| 2014/0267388 A1* | 9/2014 | Smyth | ...................... | G09G 5/14 |
| | | | | 345/629 |
| 2015/0286374 A1* | 10/2015 | Dibble | ................... | G06F 17/30 |
| | | | | 715/762 |
| 2015/0378878 A1* | 12/2015 | Sadasivam | .......... | G06F 11/3688 |
| | | | | 717/125 |
| 2016/0124917 A1* | 5/2016 | Ducat | ................... | G06F 3/0484 |
| | | | | 715/760 |
| 2016/0179658 A1* | 6/2016 | Avery | ................ | G06F 11/3696 |
| | | | | 717/135 |
| 2016/0335690 A1* | 11/2016 | Beaver | .................. | G06F 16/986 |
| 2017/0024308 A1* | 1/2017 | Knoulich | ................. | G06F 8/60 |
| 2017/0185266 A1* | 6/2017 | Dai | ....................... | G06F 9/4451 |

* cited by examiner

HUMAN MACHINE BLUR TESTING METHOD

CROSS-REFERENCED TO RELATED APPLICATIONS

This application claims benefit of U.S. Provisional Application No. 62/287,603 filed on Jan. 27, 2016, which the disclosure of which is hereby incorporated by reference in its entirety for all purposes.

FIELD OF THE INVENTION

The disclosure relates to the field of graphical user interfaces, and, more particularly, to the design and testing of graphical user interfaces that are installed in vehicles.

BACKGROUND OF THE INVENTION

Known methods of designing a graphical user interface (GUI) include implementing the design and then testing the design on an actual GUI prototype or with in-vehicle testing. A problem with such known methods is that they are time intensive and monetarily expensive.

SUMMARY

The present invention may enable the performance of a quick "blur test" when designing a GUI for an automotive application to verify that the GUI is simple, the features are large enough, and the touch points are clearly identifiable even when the image is blurred. The blurring may simulate a user driving and glancing at the display with his peripheral vision. Thus, the invention may enable the designer to create a design that does not require the driver to take his eyes off the road for a long period of time.

In one embodiment, the invention comprises a method of validating a design for a graphical user interface of a motor vehicle, including creating a tentative design for the graphical user interface. A blurred version of the tentative graphical user interface design is produced. The blurred version of the tentative graphical user interface design is tested for readability. If it is determined that the blurred version of the tentative graphical user interface design is not readable, then the graphical user interface is redesigned and the producing and testing steps are repeated for the redesigned graphical user interface. After the blurred graphical user interface design has been determined to be readable, then a first prototype of the graphical user interface is made. In one embodiment, no prototype of the graphical user interface is made until the blurred graphical user interface design has been determined to be readable. In other embodiments, the blurred version of the tentative graphical user interface design is out of focus; the tentative graphical user interface design includes alphanumeric characters and/or icons; safety-related elements of the tentative graphical user interface design are blurred to a greater degree than are entertainment-related elements of the tentative graphical user interface design; the producing step includes providing a blurring lens over the tentative graphical user interface design; and/or the redesigning includes increasing a size or changing a color of non-readable elements of the tentative graphical user interface design, increasing color contrast, changing the font type, text, or motion of the information or amount of information on screen, etc.

In another embodiment, the invention comprises a method of validating a design for a graphical user interface of a motor vehicle, including creating a tentative design for the graphical user interface. A blurred version of the tentative graphical user interface design is printed. The blurred version of the tentative graphical user interface design is tested for readability. If it is determined that the blurred version of the tentative graphical user interface design is not readable, then the graphical user interface is redesigned and the printing and testing steps are repeated for the redesigned graphical user interface. The redesigning, printing and testing steps are repeated until the graphical user interface design is readable. In one embodiment, after the blurred graphical user interface design has been determined to be readable, a first physical prototype of the graphical user interface is made. In other embodiments, no prototype of the graphical user interface is made until the blurred graphical user interface design has been determined to be readable; the blurred version of the tentative graphical user interface design is out of focus; the tentative graphical user interface design includes alphanumeric characters and/or icons; safety-related elements of the tentative graphical user interface design are blurred to a greater degree than are entertainment-related elements of the tentative graphical user interface design; and/or the redesigning includes increasing a size or changing a color of non-readable elements of the tentative graphical user interface design, increasing color contrast, changing the font type, text, or motion of the information or amount of information on screen, etc.

In yet another embodiment, the invention comprises a method of validating a design for a graphical user interface of a motor vehicle, including creating a tentative design for the graphical user interface. A blurred version of the tentative graphical user interface design is displayed on an electronic display screen. The blurred version of the tentative graphical user interface design is tested for readability. If it is determined that the blurred version of the tentative graphical user interface design is not readable, then the graphical user interface is redesigned and the displaying and testing steps are repeated for the redesigned graphical user interface. The redesigning, displaying and testing steps are repeated until the graphical user interface design is readable. In one embodiment, after the blurred graphical user interface design has been determined to be readable, a first physical prototype of the graphical user interface is made, and no prototype of the graphical user interface is made until the blurred graphical user interface design has been determined to be readable. In other embodiments, the blurred version of the tentative graphical user interface design is out of focus; the tentative graphical user interface design includes alphanumeric characters and/or icons; safety-related elements of the tentative graphical user interface design are blurred to a greater degree than are entertainment-related elements of the tentative graphical user interface design; and/or the redesigning includes increasing a size or changing a color of non-readable elements of the tentative graphical user interface design, increasing color contrast, changing the font type, text, or motion of the information or amount of information on screen, etc.

The present invention has the advantage that utilizing this test during the initial design stages helps to simulate what the drivers see in their peripheral vision while driving. Thus, the designer can determine if the touch points are clear and large enough to use while driving. This is a quick way to check whether the overall GUI design is suited to be perceived at a glance while driving so that the driver does not have to take his eyes off the road for a long period of time.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1A:
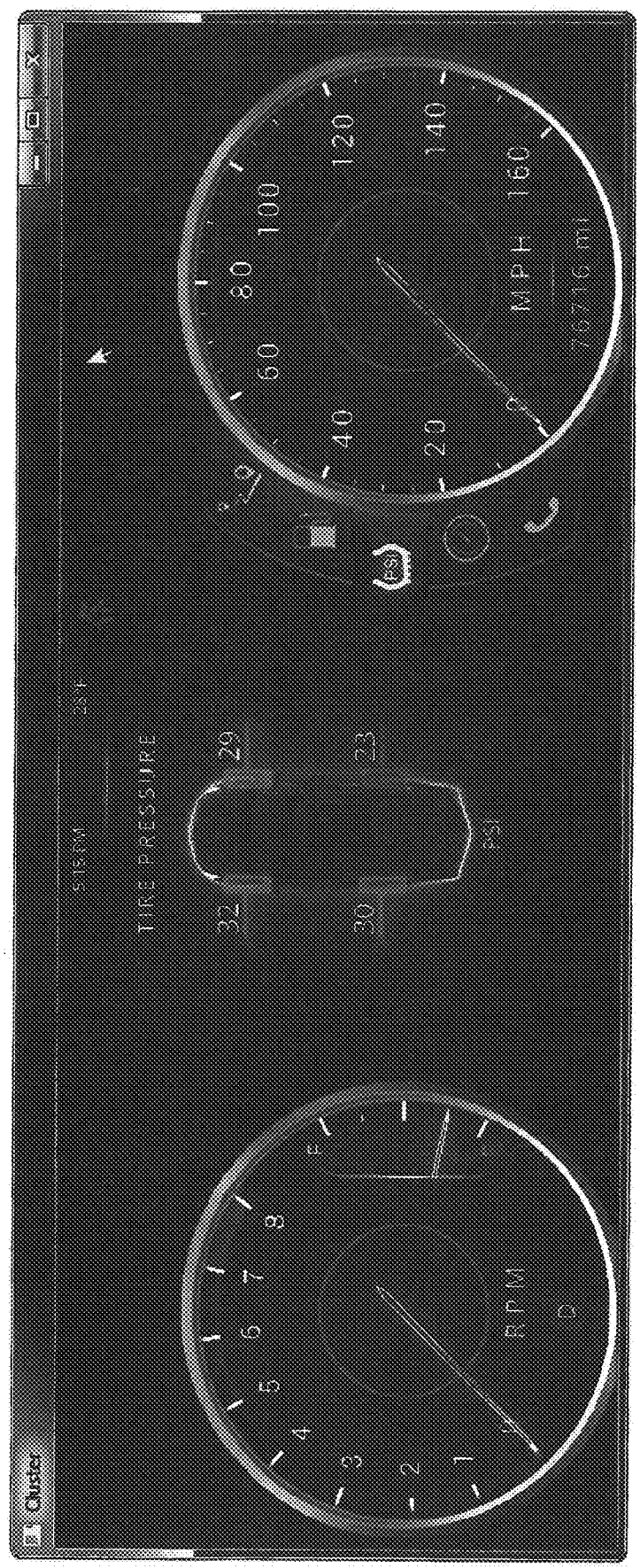
FIG. 1a is a plan view of an example GUI design for use in a motor vehicle
Figure 1B:
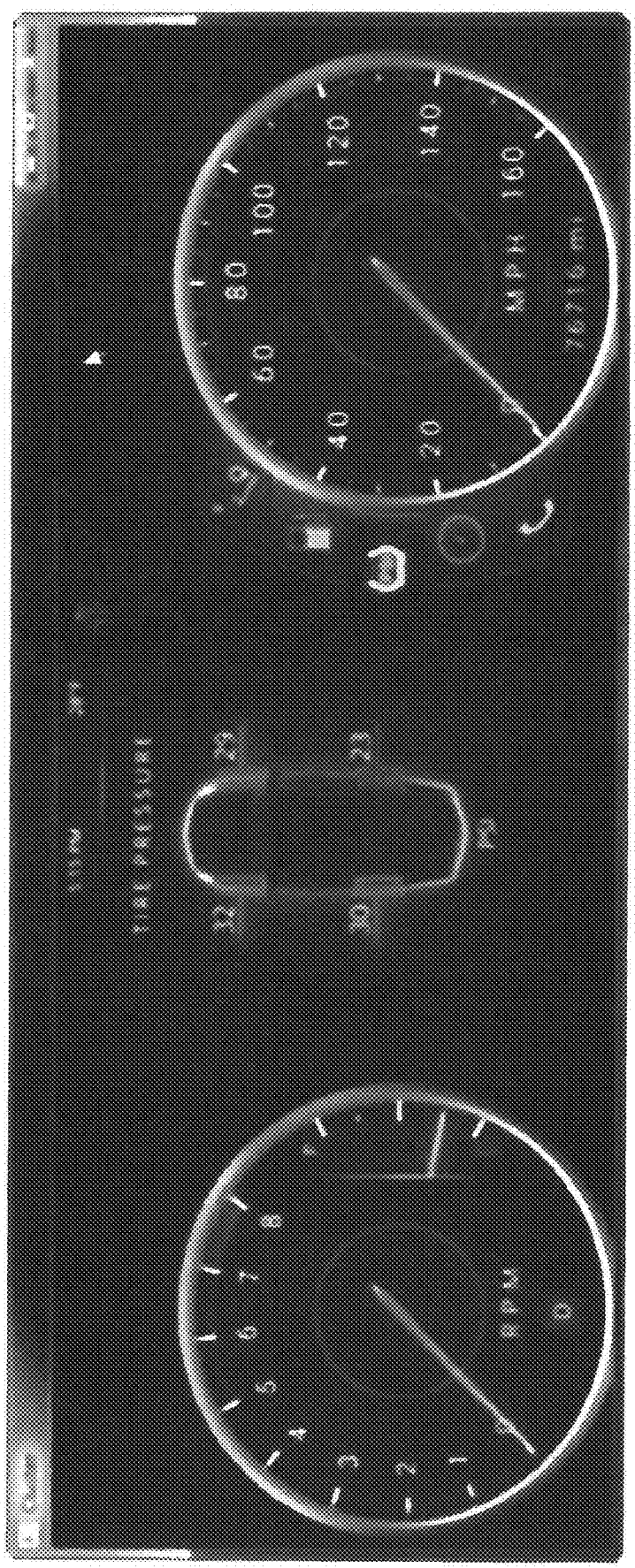
FIG. 1b is a plan view of the GUI design of FIG. 1a in a blurred state according to the present invention.

FIG. 1a illustrates one embodiment of a design of a graphical user interface for use in a motor vehicle. As can be seen, the GUI includes, from left to right, a tachometer, a tire pressure indication, and a speedometer. During testing, the GUI design may be printed on paper in the same size that it is intended to be displayed in the vehicle, but with the image being blurry or unfocused, as shown in FIG. 1b. Alternatively, the GUI design may be displayed on a display monitor printed on paper in the same size that it is intended to be displayed in the vehicle, but with the image being blurry or unfocused, as shown in FIG. 1b.

Regardless of whether the blurred test image of FIG. 1b is printed or presented on a display screen, the blurred test image may be placed a distance and angle from a test user that is equivalent to a distance and angle that the GUI is intended to be placed from the driver in the motor vehicle. The test user may then look at the blurred test image of FIG. 1b and judge whether any icons, alphanumeric characters, or other elements in the image are too small or indistinct to be seen or perceived by the test user. For example, the test user may not be able to read or discern the small characters at the top of the blurred image which read "5:15 PM" and "28° F.", and the small yellow letters to the left of the speedometer that read "PSI". The test user may inform the designer that he cannot read or discern these particular characters or icons, and the designer may respond by increasing the size or color of these characters, or by making some other change to make these characters more legible. In this scenario, by virtue of the inventive process, the design is determined to be unsatisfactory without first having to spend the significant time and money required to make and test a prototype of the unsatisfactory design. The process of printing or displaying the new design in a blurred state and testing with a test user may then be repeated as many times as necessary to arrive at a GUI design that can be read, perceived and/or discerned in a blurred state.

Figure 2A:
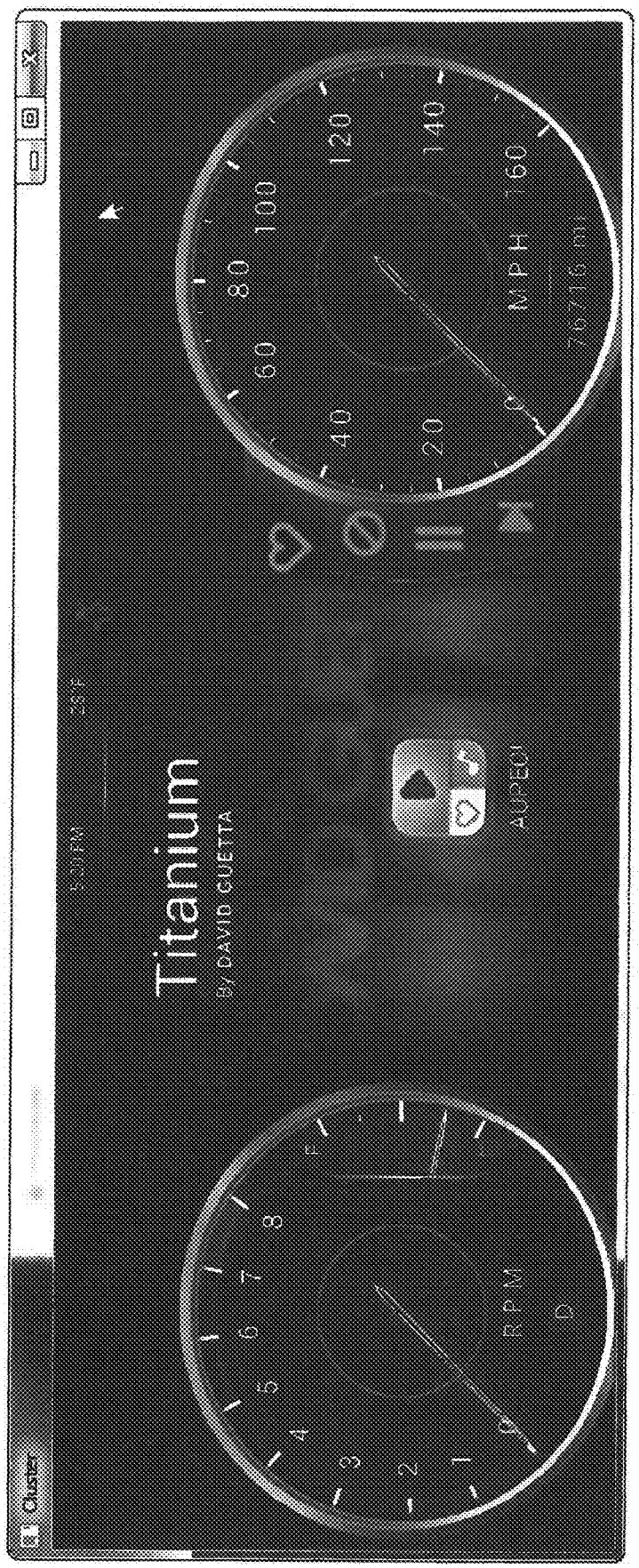
FIG. 2a is a plan view of another example GUI design for use in a motor vehicle
Figure 2B:
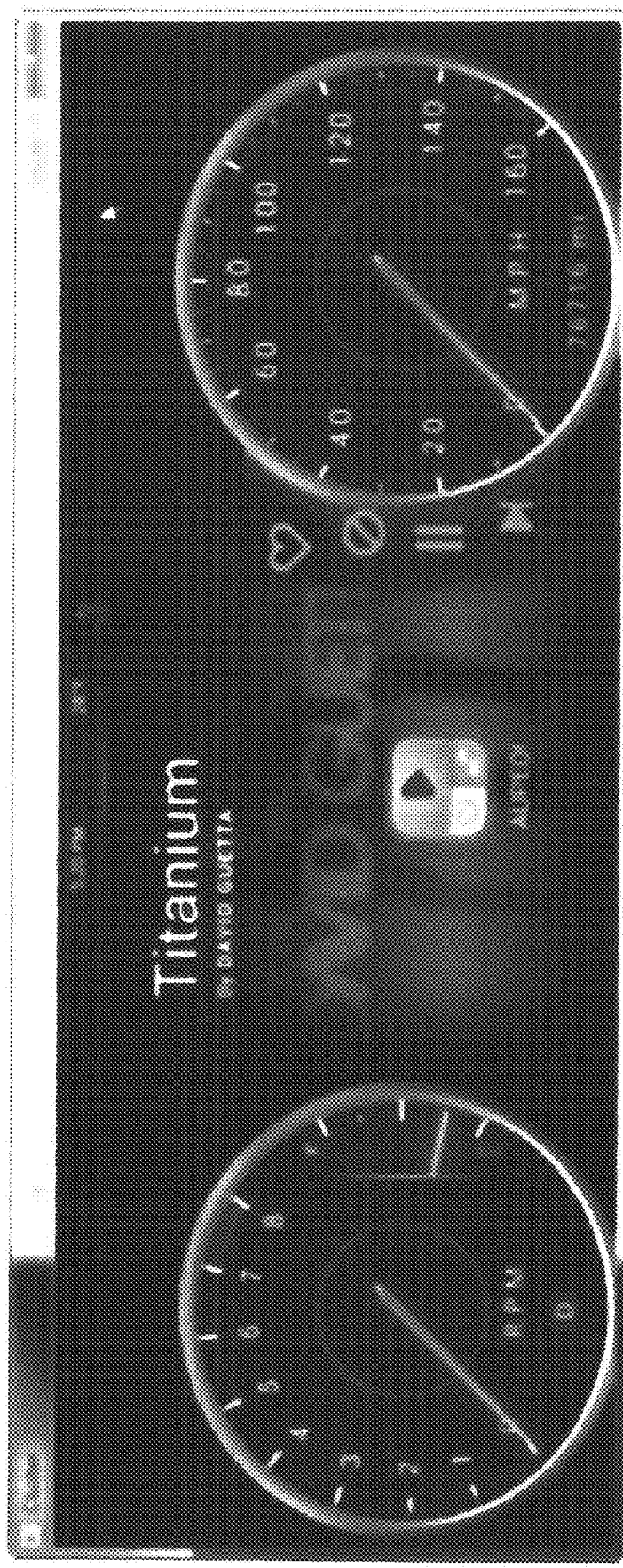
FIG. 2b is a plan view of the GUI design of FIG. 2a in a blurred state according to the present invention.

FIG. 2a illustrates another embodiment of a design of a graphical user interface for use in a motor vehicle. As can be seen, the GUI includes, from left to right, a tachometer; a cluster of icons in the middle, including a "play" icon, a "music" icon and a "heart" icon; and a speedometer. As shown in the blurred version of the GUI in FIG. 2b, the small characters at the top of the blurred image which read "5:20 PM" and "28° F." may be too small to be easily read. The "music icon" also may appear to be too indistinct for a test user to easily perceive. Thus, these elements may be redesigned according to a process similar or identical to the process outlined above with reference to FIGS. 1a-b.

Figure 3A:
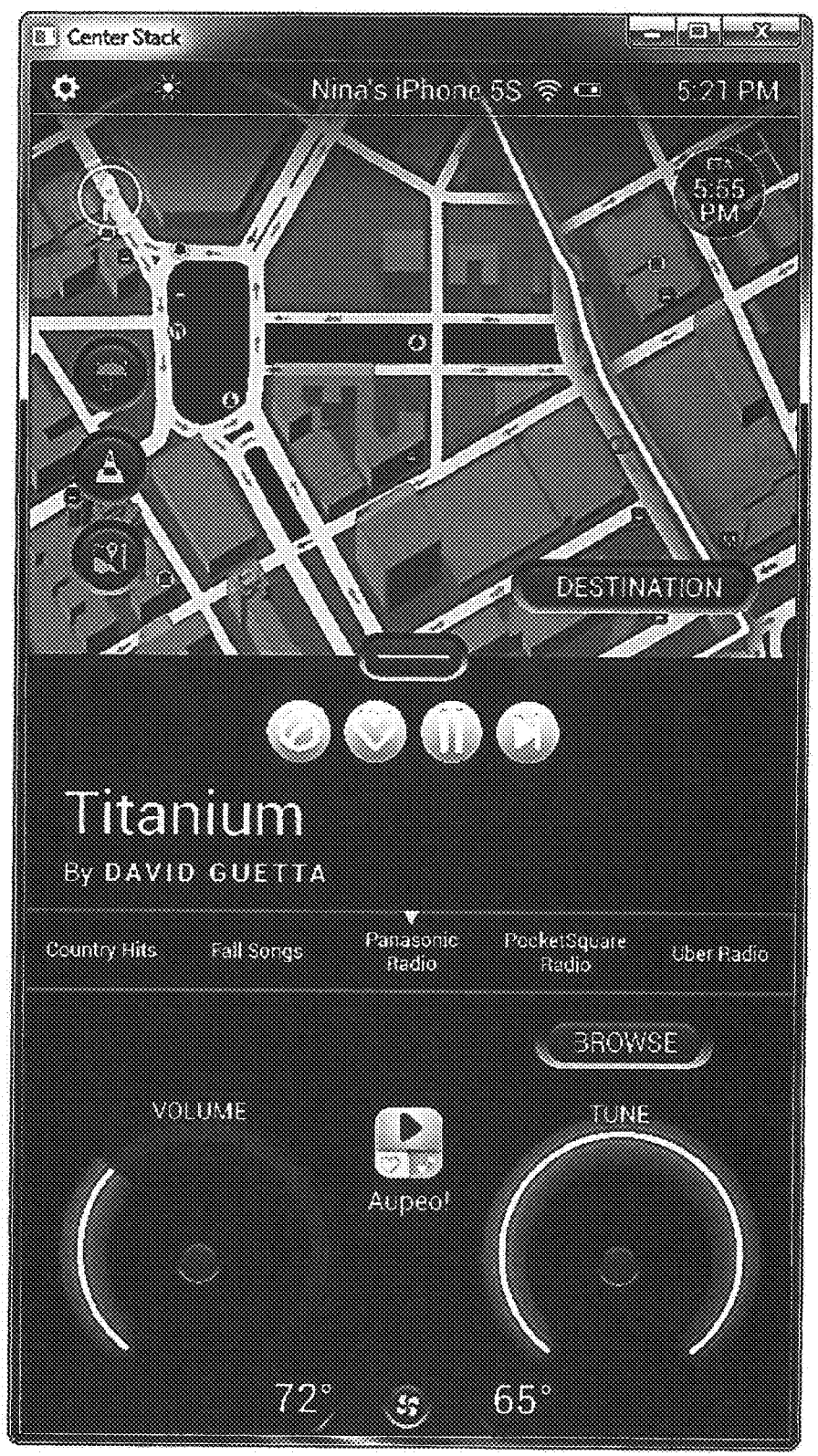
FIG. 3a is a plan view of yet another example GUI design for use in a motor vehicle
Figure 3B:
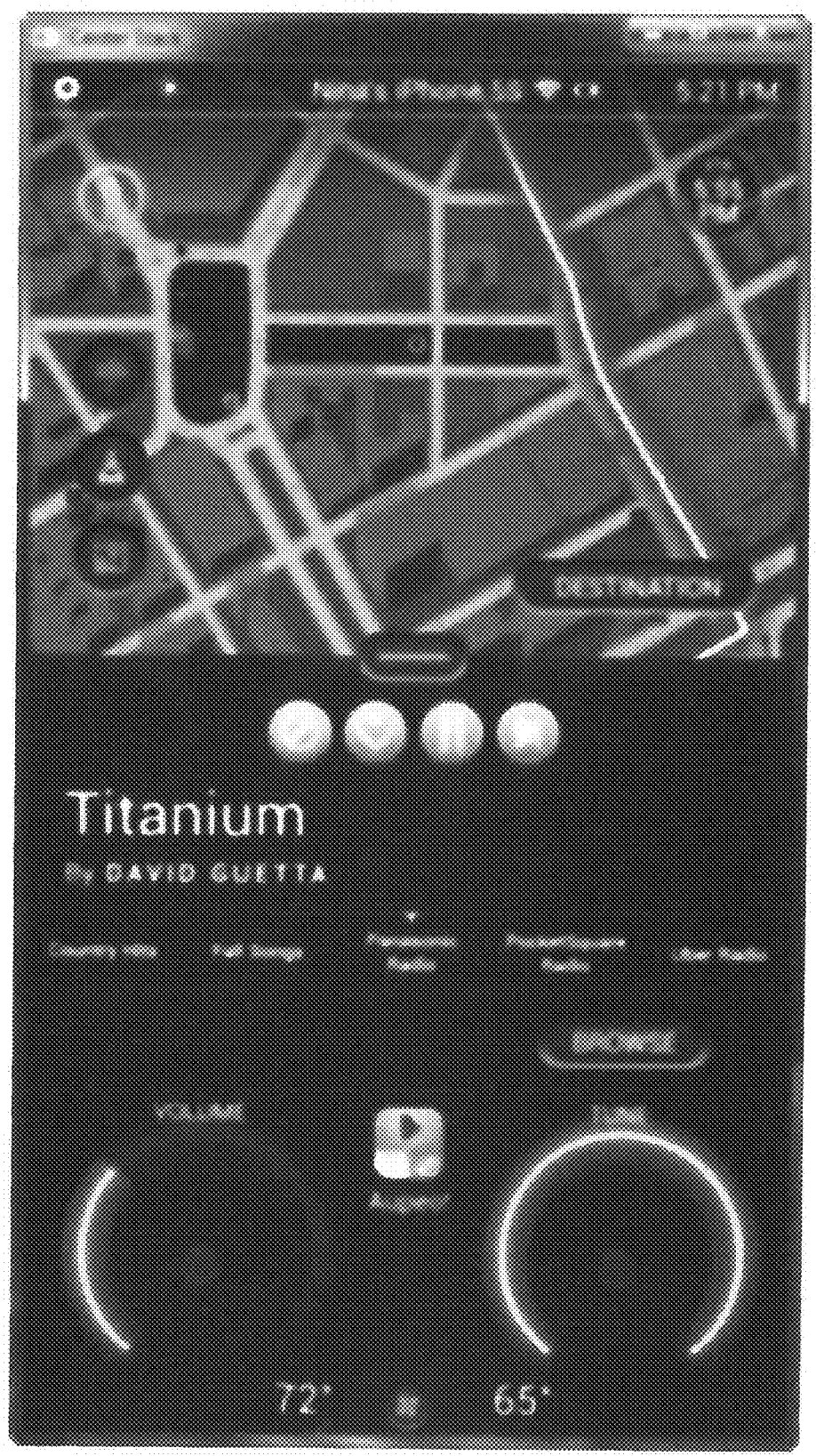
FIG. 3b is a plan view of the GUI design of FIG. 3a in a blurred state according to the present invention.

FIG. 3a illustrates another embodiment of a design of a graphical user interface for use in a motor vehicle. As can be seen, the GUI includes a navigation map having a plurality of arrows and icons in a top portion; and an audio system interface including a volume control, a tuning control, and a plurality of icons in a bottom part. Although all the elements of the GUI appear sharp and easily interpreted in FIG. 3a, as shown in FIG. 3b, there are numerous arrows, icons and characters that cannot be easily discerned in the blurred version of the GUI. Accordingly, many elements of the GUI, or the entire GUI, may be redesigned according to a process similar or identical to the process outlined above with reference to FIGS. 1a-b.

Figure 4:
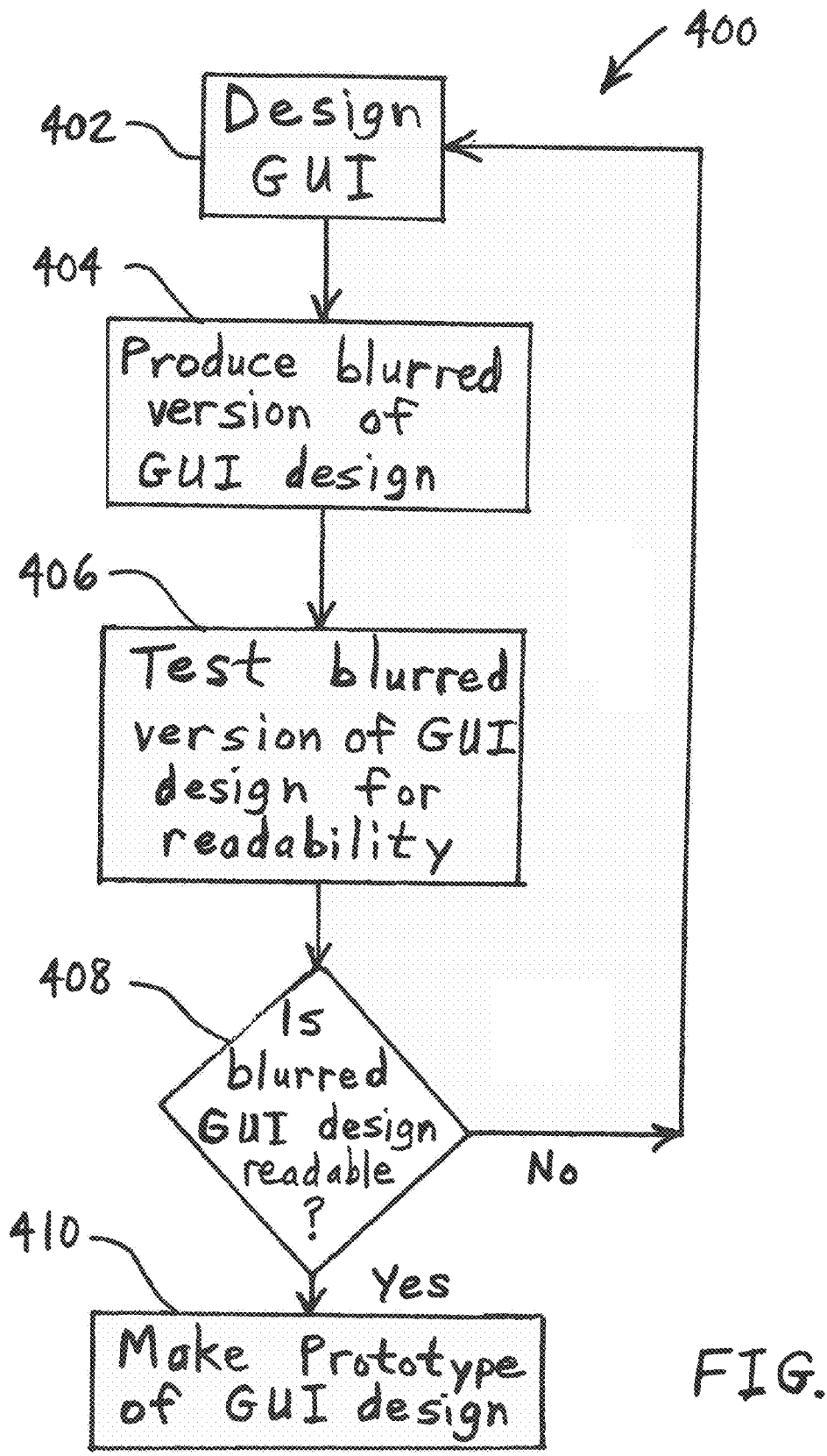
FIG. 4 is a flow chart of one embodiment of a method of the present invention for designing a GUI.

FIG. 4 illustrates one embodiment of a method 400 of the present invention for validating a GUI design. In a first step 402, a graphical user interface is preliminarily designed. For example, one of the GUIs of FIGS. 1a, 2a or 3a may be designed.

In a next step 404, a blurred version of the GUI design is produced. For example, one of the blurred GUI versions of FIGS. 1b, 2b or 3b may be produced by printing or displaying a blurred image of the corresponding GUI on a display monitor. In one embodiment, the blurring is achieved by providing a blurring lens over the GUI design. In another embodiment, the GUI design is printed in a blurred state by electronic control of the printer. In yet another embodiment, the GUI design is displayed on an electronic display monitor in a blurred state by adjusting an electronic focus control of the display monitor. In still another embodiment the image is blurred in an image editing application such as Photoshop. In a further embodiment, the blurring may be achieved by lowering the display resolution, either by lowering the display's resolution setting or by lowering the resolution of the graphics itself.

Next, in step 406, the blurred version of the GUI, including icons and images, is tested for readability and understandability. For example, one of the blurred GUI versions of FIG. 1b, 2b or 3b may be shown to a human test user at a distance and lighting conditions matching the distance and lighting conditions under which a driver would view the GUI in a motor vehicle. The test user, having never seen the GUI design before, may be quizzed by the designer to determine whether he can correctly identify all the elements, such as alphanumeric characters and icons, in the blurred version of the GUI. Alternatively, the test user could simply tell the designer which elements of the GUI he has trouble identifying.

In step 408, it is determined whether the blurred version of the GUI design is readable. For example, if the test user incorrectly identifies any of the blurred GUI elements, says that he has difficulty identifying any of the elements, or takes too long a period of time looking at the GUI, then the blurred version of the GUI design may be determined to be unreadable, and operation may return back to step 402 where the GUI may be redesigned to be more readable. The steps 402, 404, 406 and 408 may be repeated as many times as needed in order to produce a blurred version of the GUI design that is readable.

When it is determined that the blurred GUI design is readable, then in a final step 410 a prototype of the GUI design is made. That is, a higher fidelity prototype GUI, or final product GUI may be manufactured, which typically require considerable time and expense. The prototype may then be installed in a vehicle for on-the-road testing. However, according to the invention, the prototype very likely needs to be manufactured only once, because it has been verified before manufacture that the GUI design will be readable under driving conditions.

The invention has been described herein as including blurring all portions and elements of the tentative graphical user interface design equally and to a same degree. However, in another embodiment, safety-related elements of the graphical user interface design are blurred more, or to a greater degree, than are entertainment-related elements of the graphical user interface design. For example, a vehicle speed readout, which is safety-related, may be blurred more than a readout of the broadcasting frequency of the currently tuned-to radio station, which is entertainment-related. Thus, if the safety-related elements are still readable with the higher degree of blurring, then it can be known with a greater degree of confidence that the safety-related elements will be readable in the non-blurred state under driving conditions.

The invention has been described herein as including determining the legibility of the blurred text. However, in another embodiment, it is determined whether blurred touch points are intuitively and ergonomically located in an optimal location. For example, the human test subject may be asked whether he can identify an icon without reading any associated text, such as by recognizing the color and/or shape of the icon. It may also be tested whether the blurred touch areas are adequately sized for the driver to be able to touch while driving a moving vehicle.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A method of validating a design for a graphical user interface of a motor vehicle, the method comprising:
   creating a tentative design for the graphical user interface;
   producing a blurred version of the tentative graphical user interface design, the producing including providing a blurring lens over the tentative graphical user interface design;
   wherein the blurred version of the tentative graphical user interface design is out of focus;
   testing the blurred version of the tentative graphical user interface design for readability by showing a test user the tentative graphical user interface design at a distance and lighting conditions under which a driver would view the graphical user interface in the motor vehicle, wherein if it is determined that the blurred version of the tentative graphical user interface design is not readable by the test user saying which elements of the tentative graphical user interface design the test user had trouble identifying, then the graphical user interface is redesigned and the producing and testing steps are repeated for the redesigned graphical user interface; and
   after the blurred graphical user interface design has been determined to be readable, then making a first physical prototype of the graphical user interface.

2. The method of claim 1 wherein no prototype of the graphical user interface is made until the blurred graphical user interface design has been determined to be readable, and the method is iterative until the blurred graphical user interface design has been determined to be readable.

3. The method of claim 1 wherein the tentative graphical user interface design includes alphanumeric characters and/or icons.

4. The method of claim 1 wherein safety-related elements of the tentative graphical user interface design are blurred to a greater degree than are entertainment-related elements of the tentative graphical user interface design.

5. The method of claim 1 wherein the redesigning includes increasing a size or changing a color of non-readable elements of the tentative graphical user interface design.

6. A method of validating a design for a graphical user interface of a motor vehicle, the method comprising:
   creating a tentative design for the graphical user interface;
   displaying a blurred version of the tentative graphical user interface design on an electronic display screen, wherein the blurred version of the tentative graphical user interface design is out of focus;
   testing the blurred version of the tentative graphical user interface design for readability by showing a test user the tentative graphical user interface design at a distance and lighting conditions under which a driver would view the graphical user interface in the motor vehicle, wherein if it is determined that the blurred version of the tentative graphical user interface design is not readable by the test user saying which elements of the tentative graphical user interface design the test user had trouble identifying, then the graphical user interface is redesigned and the displaying and testing steps are repeated for the redesigned graphical user interface, the redesigning, displaying and testing steps being repeated until the graphical user interface design is readable.

7. The method of claim 6 comprising the further step, after the blurred graphical user interface design has been determined to be readable, of making a first physical prototype of the graphical user interface, and wherein no prototype of the graphical user interface is made until the burred graphical user interface design has been determined to be readable.

8. The method of claim 6 wherein the tentative graphical user interface design includes alphanumeric characters and/or icons.

9. The method of claim 6 wherein safety-related elements of the tentative graphical user interface design are blurred to a greater degree than are entertainment-related elements of the tentative graphical user interface design.

10. The method of claim 6 wherein the redesigning includes increasing a size or changing a color of non-readable elements of the tentative graphical user interface design.

11. The method of claim 6 wherein the displaying step includes providing a blurring lens over the tentative graphical user interface design.

12. The method of claim 6 wherein the displaying step includes lowering a display resolution of the electronic display screen.

13. A method of validating a design for a graphical user interface of a motor vehicle, the method comprising:
   creating a tentative design for the graphical user interface;

providing a blurring lens over the tentative graphical user interface design;

wherein the tentative graphical user interface design in our of focus when viewed through the blurring lens;

testing the blurred version of the tentative graphical user interface design for readability through the blurring lens by showing a test user the tentative graphical user interface design at a distance and lighting conditions under which a driver would view the graphical user interface in the motor vehicle, wherein if it is determined that the tentative graphical user interface design is not readable through the blurring lens by the test user saying which elements of the tentative graphical user interface design the test user had trouble identifying, then the graphical user interface is redesigned and the providing and testing steps are repeated for the redesigned graphical user interface; and after the graphical user interface design has been determined to be readable through the blurring lens, then making a first physical prototype of the graphical user interface.

14. The method of claim 13 wherein no prototype of the graphical user interface is made until the graphical user interface design has been determined to be readable through the blurring lens.

15. The method of claim 14 wherein the method is iterative until the graphical user interface design has been determined to be readable through the blurring lens.

16. The method of claim 13 wherein the tentative graphical user interface design includes alphanumeric characters and/or icons.

17. The method of claim 13 wherein safety-related elements of the tentative graphical user interface design are blurred to a greater degree than are entertainment-related elements of the tentative graphical user interface design.

18. The method of claim 13 wherein the redesigning includes increasing a size or changing a color of non-readable elements of the tentative graphical user interface design.

\* \* \* \* \*